(12) United States Patent
Doyle et al.

(10) Patent No.: US 6,198,822 B1
(45) Date of Patent: Mar. 6, 2001

(54) ENHANCED SCRAMBLING OF SLOWLY CHANGING VIDEO SIGNALS

(75) Inventors: John F. Doyle, Campbell; Stephen C. Snell, Aptos; Mitchell Askenas, Sunnyvale, all of CA (US); Ted Hartson, Scottsdale, AZ (US)

(73) Assignee: ICTV, Inc., Los Gatos, CA (US)

( * ) Notice: Subject to any disclaimer, the term of this patent is extended or adjusted under 35 U.S.C. 154(b) by 0 days.

(21) Appl. No.: 09/034,960

(22) Filed: Mar. 4, 1998

Related U.S. Application Data (60) Provisional application No. 60/074,291, filed on Feb. 11, 1998.

(51) Int. Cl.[7] ............................ H04N 7/167; H04N 7/171; H04N 1/44
(52) U.S. Cl. ............................ 380/210; 380/212; 380/218
(58) Field of Search .................................... 380/200, 207, 380/210, 212, 213, 216, 218

(56) References Cited

U.S. PATENT DOCUMENTS

| | | | |
|---|---|---|---|
| 4,562,465 | * 12/1985 | Glaab | .................................... 358/120 |
| 4,682,360 | * 7/1987 | Frederiksen | .............................. 380/10 |

* cited by examiner

*Primary Examiner*—Tod B. Swann
*Assistant Examiner*—Justin T. Darrow
(74) *Attorney, Agent, or Firm*—Bromberg & Sunstein LLP (57) ABSTRACT

An enhanced scrambled video signal, method for making an enhanced scrambled video signal and apparatus for enhanced scrambling of a video signal are all characterized by a pattern added to a video signal. The pattern is formed from a pair of segments, including a black segment and a white segment which forms a high contrast transition therebetween. The transitions vary in horizontal location from one horizontal line to the next. The pattern causes an unauthorized television receiver to mistakenly lock onto the transitions in the pattern, as if the transitions represented horizontal sync signals, thus scrambling the video display. The apparatus for inserting the pattern may be formed by a sync detector, a video amplifier, a multiplexor and a control logic device. The video amplifier sets the video signal to a DC reference level. The sync detector detects the horizontal sync of the video signal which is sent from the video amplifier. The sync location is passed from the sync stripper to the control logic device which sends control pattern insertion signals to the multiplexor. The multiplexor combines the video signal with the black, white, and gray reference signals based on the control information to add the pattern to the video signal.

53 Claims, 4 Drawing Sheets

THIS IS AN E-MAIL
MESSAGE THAT SHOULD
REMAIN PRIVATE

ENHANCED SCRAMBLING OF SLOWLY CHANGING VIDEO SIGNALS

This application claims priority from provisional application Ser. No. 60/074,291, filed Feb. 11, 1998, entitled "ENHANCED SCRAMBLING OF SLOWLY CHANGING VIDEO SIGNALS" which is incorporated herein, in its entirety, by reference.

FIELD OF THE INVENTION

The present invention is related to scrambling of television video signals, particularly scrambling of slowly changing video signals such as textual messages like electronic mail or Web pages.

BACKGROUND OF THE INVENTION

Scrambling of television video signals is well known. It is often used in cable television systems in connection with the delivery of premium services. Those subscribers who have paid for the premium service are given authorization and key to decoding the scrambled video signal so that the original video image can be displayed on their television screens. More recently, interactive television systems contemplate using cable distribution networks to deliver services on an individualized basis. Such services may include Internet access, electronic mail, catalog shopping or other services which display still frame pictures on a television screen.

A scrambled signal is typically one in which the synchronization signals of the television video signal have been suppressed by baseband or rf sync suppression techniques. Conventional television sets look for the horizontal sync signals of each line to locate the beginning of a line and synchronize the raster display. Horizontal sync signals are provided at the beginning of each line outside the scope of the picture that will be displayed on the television screen. A horizontal sync signal is typically characterized by a negative DC voltage level below that of a voltage level representative of a black image. When displaying a scrambled signal with suppressed horizontal sync signals, the television looking for horizontal sync signals will typically settle upon a sharp transition—from white to black, for example. With a typical moving picture that has been scrambled, the television will lock into a variety of ever changing transitions formed in the actual picture image thus causing the horizontal orientation of each line to vary in space and time. The picture displayed on a television when it is playing a scrambled television video signal that it cannot decode destroys the original image so that it cannot be enjoyably viewed. When the scrambled signal is a still image such as an electronic mail message or a web page, there is a danger that the television will lock onto the beginning of the text or any other still vertical image element such as the edge of a text box or computer window or other framing graphic element. In the case of a textual message, with the transition from a light background to the blacker text remaining fixed in horizontal location over several lines and over time, the television may successfully and repeatedly lock into the same edge during each raster cycle. The danger is that the message may be quite readable even though the sync signals have been suppressed. Thus, the desired level of privacy for the scrambled signals may not be achieved.

Internet access and electronic mail may find prevalence with the advent of interactive cable systems. Aspects of such systems for providing interactive services on a demand basis are described in U.S. Pat. No. 5,550,578; U.S. Pat. No. 5,883,661; U.S. patent application Ser. No. 08/987,405 filed Dec. 9, 1997; and U.S. Provisional Patent Application Ser. No. 60/067,990 filed Dec. 9, 1997, all having the same assignee as the present application. The full disclosure of each of these patent references is hereby incorporated by reference herein.

SUMMARY OF THE INVENTION

Embodiments of the present invention are directed to including a pattern on the video signal of a slowly changing video image in order to promote and enhance scrambling of the signal such that text in the image is not legible upon playback by an unauthorized television set. In order to help clarify the description of the invention as set forth herein, it should be understood that the video signal is often described herein in terms of the video image it would display with its original horizontal synchronization signals in place. The pattern is generally described herein in terms of how it would appear if the active horizontal lines were displayed in their entirety and the lines were synchronized according to the original horizontal synchronization signals. It is recognized that in order to make a video signal with the pattern, the signal need not be displayed and thus the pattern need not be viewed. A horizontal synchronization signal while typically not being displayed has a signal duration that corresponds to a length of screen image if it were displayed. Locations on a line of a video image, as used herein, correspond with time periods on a video signal relative to the horizontal synchronization signal regardless of whether that horizontal signal is present as in an unscrambled signal or suppressed as in a scrambled signal.

The pattern may be added by conventional computing methods when the video to be displayed is in computer graphics or VGA format. Alternatively, the pattern may be directly imposed upon the video signal as it is being converted to or while it is in NTSC, PAL or other like television signal format for conventional television display. The pattern is characterized by a pair of segments on each horizontal line. The pair includes a black segment having a duration at least about as long as the horizontal sync signal and a white segment adjacent to each black segment to form a high contrast transition between the two. From one horizontal line to the next, the pairs of black and white segments are arranged so that the high contrast transition varies in horizontal location from one line to the next. The pattern may further include gray segments that follow each pair of black and white segments. In accordance with the presently preferred embodiment of the pattern, the pairs of black and white segments form a zigzag that would appear to extend vertically within a column located along the right side of a display of the video signal (assuming its sync signals are in place).

An unauthorized television receiving such a signal with the pattern will typically tend to lock onto the black and white transitions formed by the pattern. By varying the horizontal locations of these transitions from one line to the next, images such as text or indeed any image will be essentially shredded and illegible on the television screen.

Insertion of the pattern, may be performed by an apparatus including a sync stripper, DC restored video amplifier, a control logic device and a multiplexor. An optional low-pass filter may be added to the output of the multiplexor to remove multiplexor switching noise. The sync stripper detects the horizontal sync signal within the video signal, and determines the back porch of the video signal. This information is passed to the DC restored video amplifier for adjusting the DC level of the video signal and to the control logic device. The multiplexor has inputs for black, white and gray DC level signals and an input for the video signal. Based on the control signal from the control logic device, switching occurs for the various inputs, so that at the output of the multiplexor, an enhanced scrambled video signal is formed. Horizontal sync suppression can be done in conjunction with the aforementioned apparatus.

Other objects and advantages of the present invention will become apparent during the following description of the presently preferred embodiments of the present invention taken in conjunction with the drawings.

DETAILED DESCRIPTION OF SPECIFIC EMBODIMENTS

Figure 1:
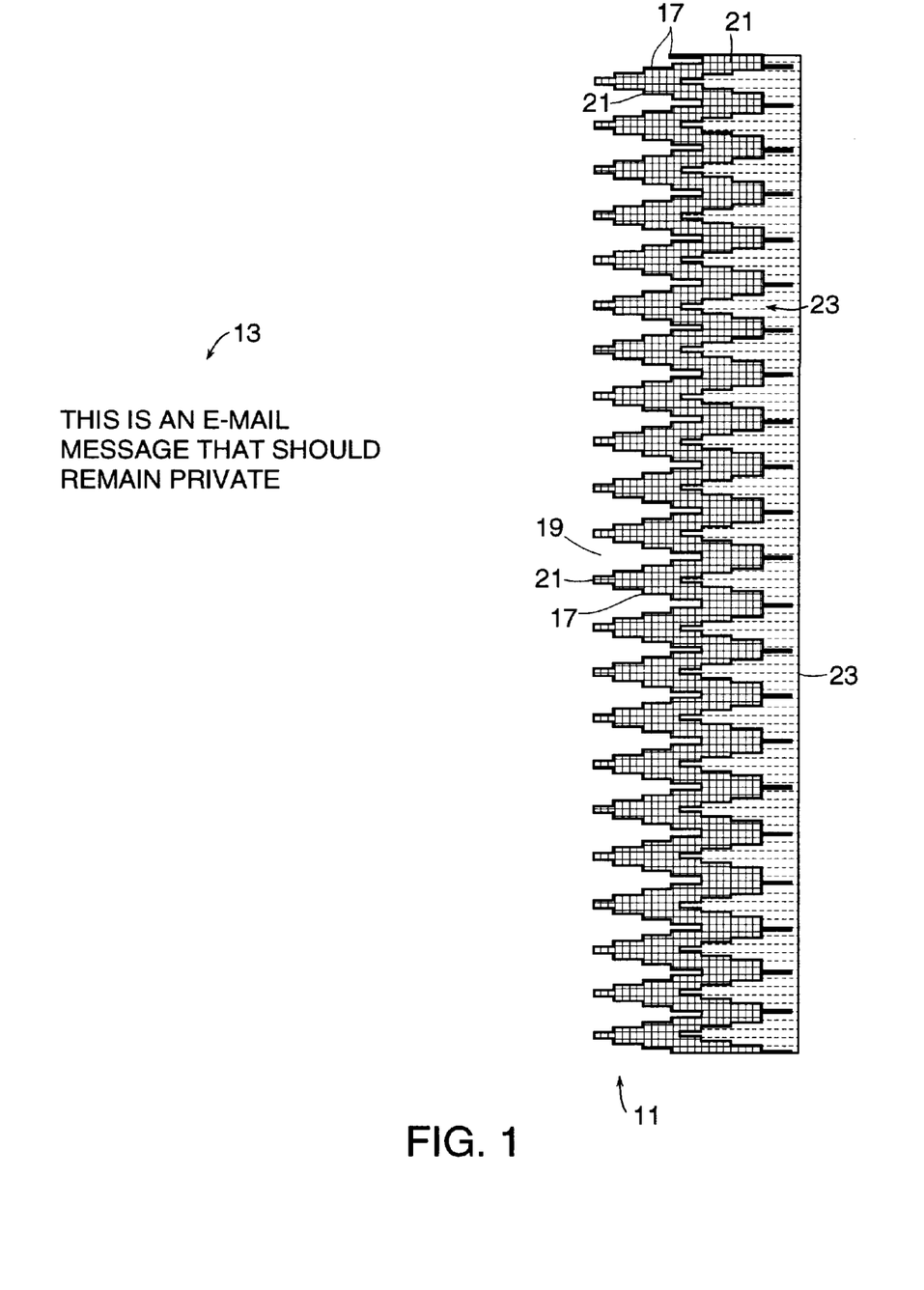
FIG. 1 is an illustration of a computer screen including an embodiment of the pattern for enhanced scrambling according to the invention.

Referring now to the drawings, FIG. 1 shows a pattern 11 added to a computer display image so that it will experience enhanced scrambling on conversion to a scrambled television video signal. While the pattern 11 is being shown and described with respect to a computer graphics image, it should be understood that the pattern may be imposed on a television signal such as an NTSC or PAL signal in electronic form without being displayed. The pattern as described represents a full display of the NTSC or PAL signal if it included its original sync signals. The pattern might still not be viewed on the television set because preferably it would appear in a margin along the right hand column that extends beyond the right edge of the television screen. Theoretically, if the full image were viewed, the pattern 11 would appear in the video image.

The video image to be scrambled includes an electronic mail message 13 in the illustration of FIG. 1. It is desirable that the electronic mail message 13 be illegible upon being converted to a scrambled television signal and displayed on an unauthorized television. The concern is that without the pattern 11, the unauthorized television will lock onto possibly the first letter of each line of text thereby resulting in a fairly regular false horizontal synchronization resulting in a potentially readable message at the unauthorized television. The pattern 11 is designed so that the electronic mail message will be illegible at unauthorized subscriber television sets.

The pattern 11 is characterized (when synchronized and displayed) at each horizontal line by a pair of adjacent white and black segments. The duration of each black segment 17 is at least about as long as a horizontal sync signal. In other words, while the black segment is preferably about the same duration as a horizontal sync signal, it may be longer. While the term black is used herein, it should be understood that a black segment 17 for use in pattern 11 of the present invention includes any signal that could have a potential for being mistaken for a horizontal sync signal. Typically, the black segment 17 will have a zero chrominance level, in other words no color, and zero luminance level. The black segment 17 can be recognized in a video signal by its low voltage. In most current television signals, black is characterized by a negative voltage level, horizontal sync is an even lower negative voltage level and white is characterized by a highest positive voltage level. Adding chrominance or luminance to the black segment may cause a weakening of the desired shredding effect upon display of the scrambled video signal on an unauthorized television. The white segments 19, on the other hand, are included to provide a high contrast transition 21 on each horizontal line between the white segment 19 and the black segment 17. The term white as used herein with respect to the white segment 19 is meant to include any segment whose characteristics achieve the desired high contrast transition 21 with the adjacent black segment 17 on a horizontal line of a television signal. The transition, which is visual when displayed, is a voltage drop on a video signal. The term high contrast transition corresponds to the voltage drop as well as the visual white-black transition. The white segment 19 preferably has no chrominance and is near or equal to the reference white level for the television signal. Both the black and white segments may be color segments so long as the difference between the two segments can be mistaken for the horizontal sync signal by a television receiver.

The black and white segment pairs are provided on at least each horizontal line of the television signal that has video image information to be scrambled. It is preferred that every horizontal line include the black and white segment pairs so that the unauthorized television set does not resort to a search mode when the pairs are missing while attempting to display the television picture. It is desired that the unauthorized television set lock into the black and white transitions 21 of the pattern 11 when displaying the television signal. Thus, the pattern 11 preferably extends vertically from the top to the bottom substantially along the entire vertical length of a video image.

The pairs of black and white segments are arranged so that the high contrast transitions 21 vary in horizontal location (i.e., in time relative to the original horizontal sync signal) from one horizontal line to the next. It is desirable that the change in horizontal location from one line to the next line is gradual so that the unauthorized television set is more likely to accept the white-black transitions of the pattern 11 as the horizontal sync signal. Thus, from one black-white pair to the next black-white pair on the next horizontal line, it is desired that the high contrast transition vary by less than the duration of the black segment and more preferably less than ⅓ the duration of the black segment. It is also desirable to have a distant maximum variance in the horizontal location of the white-black transitions 21 so that by locking into these transitions, the unauthorized television set shreds the video image so that it becomes illegible. Thus, there should be at least some black segments that are horizontally separated from other of the black segments in the pattern 11 without any horizontal overlap therebetween. The pattern 11 of the presently preferred embodiment shown in FIG. I provides a vertical zigzag. At least the furthest left black segments and the furthest right black segments are separated from each other horizontally such that there is no horizontal overlap. The zigzag pattern advantageously permits the gradual changes in horizontal location from one horizontal line to the next and yet still provides the widely separated black segments at the extremes of the zigzag pattern. While a zigzag pattern is shown herein, it should be understood that other patterns may be used in accordance with the criteria set forth herein for achieving the desired enhanced scrambling.

In accordance with an embodiment of the invention, the pattern 11 further includes gray segments 23 provided adjacent the black segments 17 opposite from their respective white segments 19. In the pattern of FIG. 1, the gray segments 23 appear along the right edge of the video image. It is desired that the gray segments 23 extend at least to the end of an active horizontal line as defined by the video standard for the particular video signal (NTSC, PAL, etc.). It would be highly undesirable to permit an unauthorized television set to interpret the rightmost edge of the television signal as the horizontal sync transition. The gray segments are provided with characteristics in terms of voltage and luminance mid-level between the white and black segments. The gray segments have preferably no chrominance. The gray segments preclude occurrence of a large transition at the rightmost edge of the television signal. The gray segments may be color segments, so long as, the color segment is approximately mid-level between the black and white segments in terms of voltage and luminance.

While it is preferred to provide pattern 11 along the right edge of the television signal, one may also, within the scope of the present invention, flip the pattern around and provide it along the left hand edge of the television signal. Moreover, the pattern 11 of the present invention need not be provided along the edge of the television signal. However, using the pattern in the middle of the television screen would obstruct the video image with the pattern for even the authorized viewers of the television signal. Thus, it is desirable to have the pattern located inconspicuously with respect to the video image to be displayed on authorized television sets.

Figure 2:
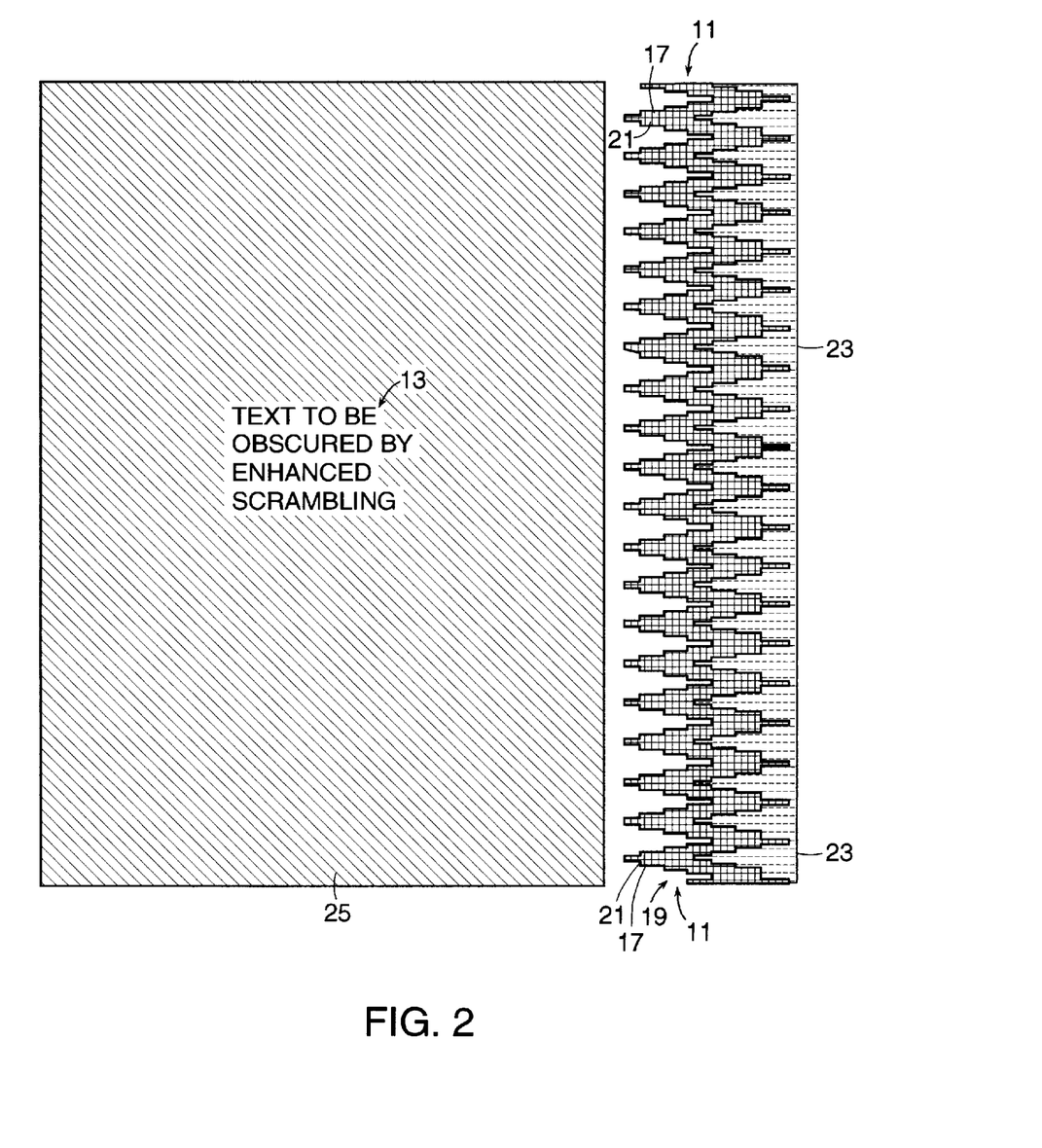
FIG. 2 is an illustration of a computer screen modified in accordance with a second embodiment of achieving enhanced scrambling according to the invention.

Referring now to FIG. 2, the effect of the present invention may be further enhanced by dimming the subject video image so that the displayable desired video image is sure to lack the high contrast transitions of the pattern 11. Thus, for an electronic mail message 13 the message is preferably not displayed as black text on white background- The luminance levels of the white may be lowered to reduce the contrast and create a dimmed background 25. Also, if desired, the luminance of the black may be raised. Another technique would be to add chrominance to the background and/or text.

For enhanced scrambling of video images that originate from computer graphics, the pattern 11 may be simply added by a computer to the computerized image. The modified image will thereafter be converted into a television signal. For example, a simple program may be written to eliminate a right-hand column from a bit-mapped screen and replace it with the pattern 11. The resulting computer screen in VGA or other suitable graphics format can then be converted to a television signal such as NTSC.

The television signal is scrambled thereby suppressing the synchronization signals. The resulting scrambled signal contains the pattern 11 although it will not be seen in its original form when displayed on an unauthorized television set. Such display will preferably be unrecognizable. An authorized television set, upon restoring the synchronization signals, can display the original video image. The pattern may appear along an edge of the picture or it may be so far to the edge that it does not actually appear on the television screen.

Figure 3:
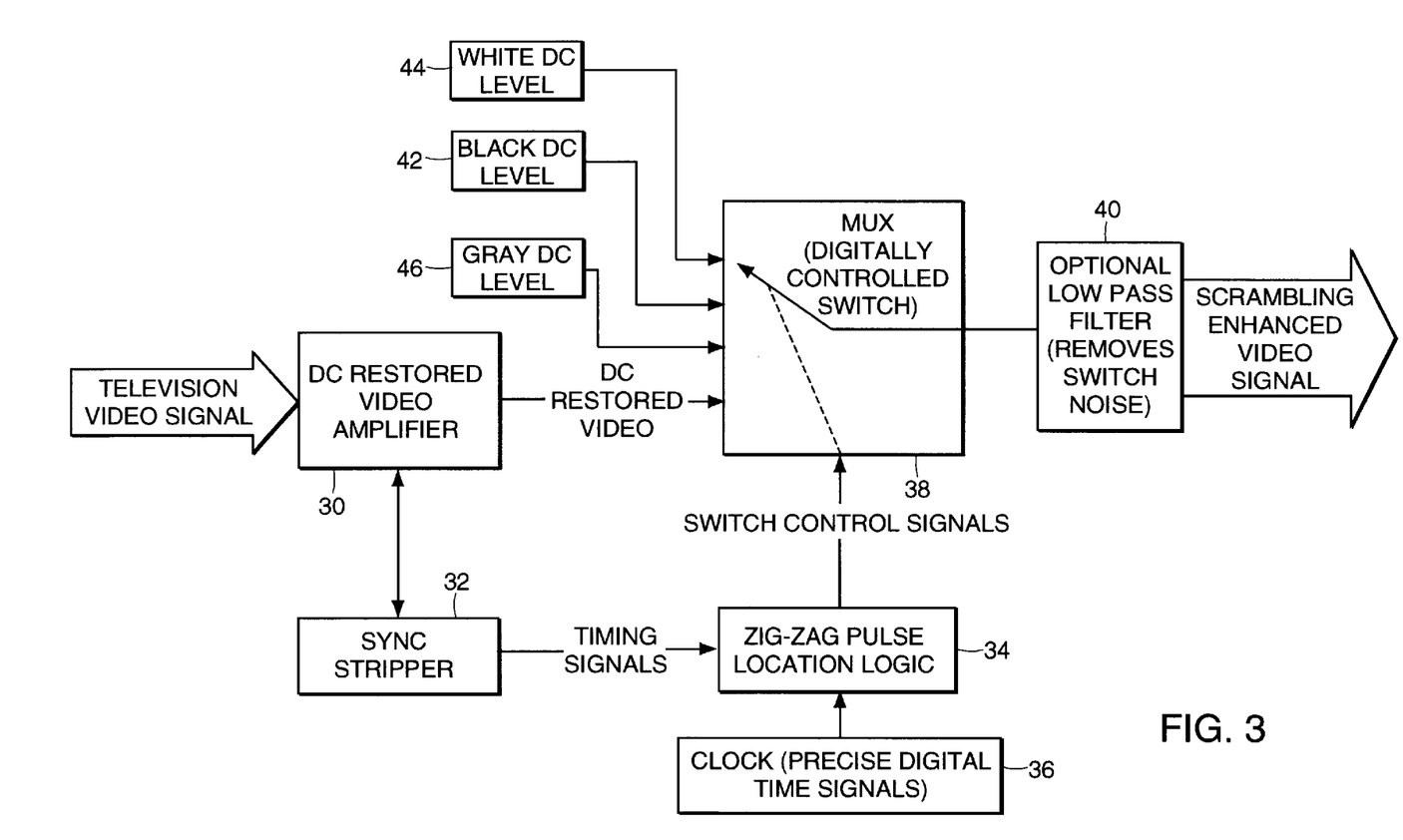
FIG. 3 is a schematic block diagram of an apparatus for inserting an enhanced scrambling pattern.

Instead of modifying the VGA output from a computer, the enhanced scrambling of the invention can be accomplished by adding the pattern to a television signal. Referring now to FIG. 3, apparatus is shown for inserting a pattern in accordance with an embodiment of the invention onto a television video signal. The DC restored video amplifier 30 works in conjunction with a sync stripper 32. The sync stripper 32 detects the horizontal sync signal on the television video signal and outputs a burst flag which is used by the DC restored video amplifier 30. The burst flag occurs right at the point of the back porch signal portion of the television video signal. The DC restored video amplifier 30 is configured with a feedback loop so as to force the DC level of the back porch to a fixed DC reference level. The white, black and gray levels of the pattern 11 that are added into the video signal are reference levels that are fixed relative to a reference back porch DC level. The DC restored video amplifier normalizes the video signal to the reference back porch DC level.

The sync stripper 32 is also used to detect vertical synchronization signals. The timing signals, vertical and horizontal, from the sync stripper 32 are provided to zigzag pulse location logic 34. The pulse location logic, or as it is otherwise referred to, the control logic device, may be formed by a programmable logic device or by a suitably programmed microprocessor. The pulse location logic/control logic device 34 works in conjunction with a clock 36. Upon receiving a horizontal timing signal, the pulse location logic counts signals from the clock 36. At time periods along the video signal, predetermined according to the desired pattern, the pulse location logic 34 instructs a multiplexer 38 to supply a reference signal level to form one of the black, white or gray segments of a pattern 11. The video multiplexer 38 is in connection with a black reference signal 42, a white reference signal 44, a gray reference signal 46 and the DC restored video signal from the DC restored video amplifier 30. A particularly efficient use of the video multiplexer chip 38 could involve connecting it with other signals to perform portions of the scrambling operation in addition to pattern insertion. Alternatively, scrambling can be provided as a separate process after the pattern insertion such as horizontal sync suppression or insertion of a false horizontal sync.

In accordance with a presently preferred embodiment of the pattern insertion apparatus, the DC restored video amplifier may be an Elantec EL2090, the video multiplexer chip may be a Maxim MAX455 8-way video multiplexer chip and the pulse location logic may by an Altera EPM 7076. If desired, the signal from the multiplexer 38 may be passed through a low-pass filter 40 to remove noise on the video signal caused by the multiplexer switch.

The pattern insertion apparatus of FIG. 3 can be advantageously used to accurately place the pattern to the rightmost portion of the active horizontal line of a video signal. This may be far enough right on the signal to advantageously avoid appearing in a display of the video signal on an authorized television set.

While one system arrangement is shown for pattern insertion, it should be understood that alternative hardware may be provided for achieving a desired enhanced scrambling pattern. It is only necessary to detect the existing horizontal sync signal and add the corresponding white, black and gray segments after a measured time delay for each line. Thereafter, the horizontal sync signals may be suppressed in accordance with conventional scrambling processes.

Figure 4:
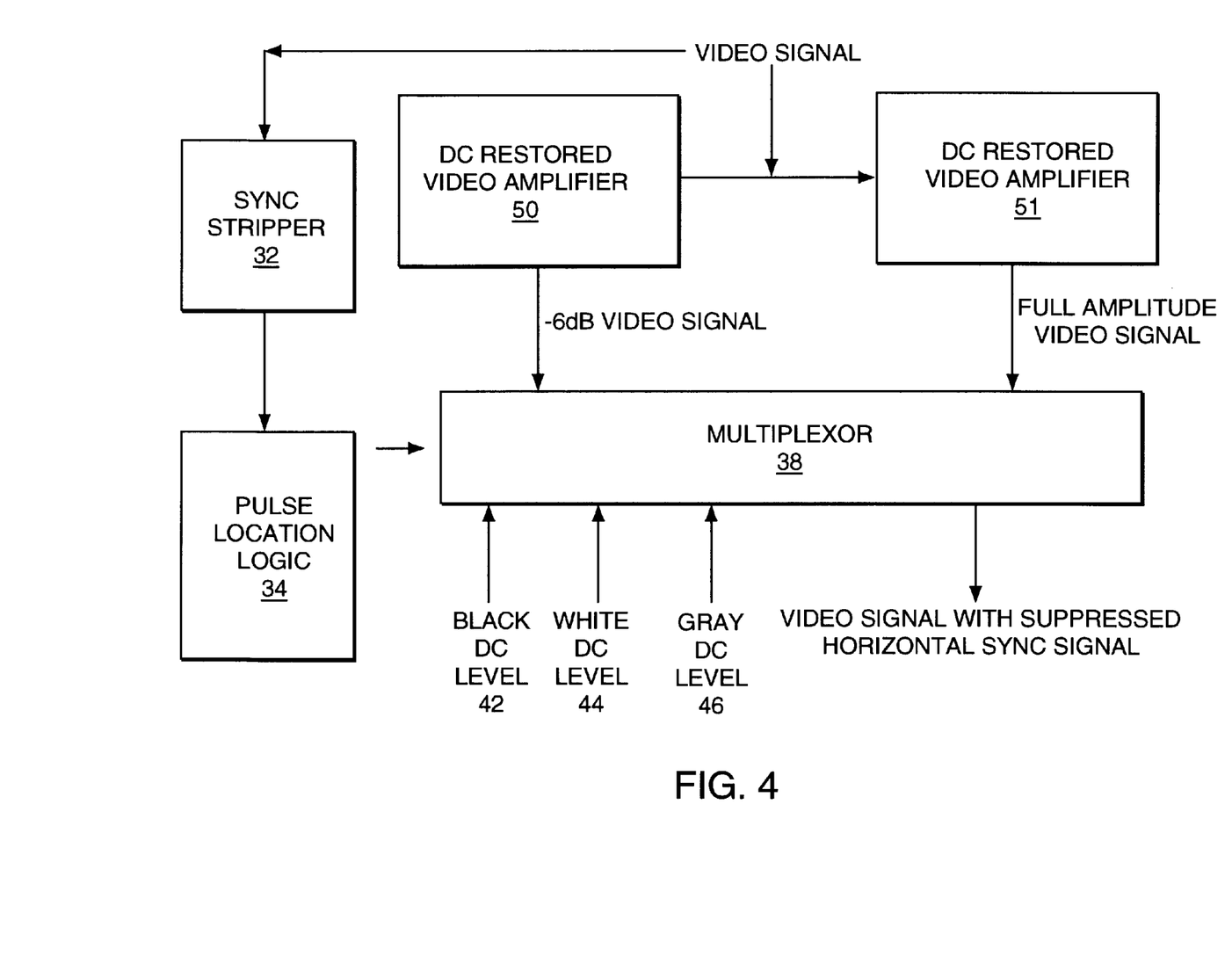
FIG. 4 is a schematic block diagram of an apparatus for suppressing the horizontal sync signal and inserting an enhanced scrambling pattern.

One method of horizontal sync suppression is to incorporate the horizontal sync suppression into the system for pattern insertion. This may be done in the following way as shown in FIG. 4. The video signal is first split into two equal signals. Both signals have the same amplitude. One of the two identical video signals is provided to a DC restored video amplifier 50 which reduces the amplitude of the signal by at least 6 dB. While the signal is in the DC restored video amplifier 50 it undergoes DC adjustment to the reference back porch signal. The second video signal is sent to a second DC restored video amplifier 51. The amplitude of this video signal is not reduce. The only processing that is done is adjusting the video signal to the DC reference back porch level. Both of the video signals, the −6 dB video signal and the full amplitude video signal are sent into a multiplexer 38. The multiplexor 38 receives these two video signals along with control information from the pulse location logic 34 which is informed by the sync stripper 32 as to where the horizontal sync signal is located within the video signal. The sync stripper 32 detects the horizontal sync signal and sends this information to the pulse control logic 34 which sends a signal to the multiplexor 38 telling it to switch between the −6 dB video signal and the full amplitude video signal whenever the horizontal sync signal occurs. This way the full amplitude video signal occurs in every place where the horizontal sync signal is not, and the −6 dB video signal occurs in place of the horizontal sync signal. The combined video signal which is output by the multiplexor 38 is the same as the original video signal, but with the horizontal sync signals suppressed by 6 dB. 6 dB suppression is not a requirement of the current invention. All that is required is that the horizontal sync signal be suppressed in some fashion so that a normal television set would not be able to lock onto the suppressed horizontal sync signal. In an alternative version it would even be possible to insert a completely false horizontal sync signal rather than suppressing the horizontal sync signal. The use of a pattern 11 to enhance the scrambling of slowly changing video signals may be incorporated into any scrambling system for television signals that involves horizontal synchronization suppression.

Of course, it should be understood that various changes and modifications to the preferred embodiments described above will be apparent to those skilled in the art. For example, the pattern could resemble a sawtooth pattern or a sine wave. Alternatively, the pattern need not be periodic nor repetitious. Moreover, the enhanced scrambling patterns of the invention are suitable for any sync suppression scrambling system for use in subscription television, interactive television and any other such systems that scramble television signals. These and other changes can be made without departing from the spirit and scope of the invention and without diminishing its attendant advantages. It is, therefore, intended that such changes and modifications be covered by the following claims.

We claim:

1. A scrambled video signal having a series of suppressed horizontal sync signals defining therebetween horizontal lines for television display upon restoring a horizontal sync signal to each horizontal line, said scrambled video signal transmitted on a carrier wave, said scrambled video signal comprising:

a pair of segments, to promote enhanced scrambling, on each horizontal line that has video image information to be scrambled, each pair of segments including a black segment capable of being interpreted by a television receiver as the horizontal sync signal and a white segment adjacent to each black segment to form a high contrast transition therebetween, the pairs of black and white segments being arranged so that the high contrast transitions vary in horizontal location from one horizontal line to the next.

2. The video signal of claim 1 wherein, upon restoration of the horizontal sync signal to each horizontal line, the pairs of segments form a pattern in a vertical arrangement extending along the vertical length of the television display.

3. The video signal of claim 1 further comprising a gray segment following each pair of black and white segments.

4. The video signal of claim 3 wherein each gray segment extends to an active end of its horizontal line.

5. The video signal of claim 1 wherein the pairs of black and white segments are arranged so that, upon restoration of the horizontal sync signal to each horizontal line, the high contrast transitions form a vertically extending zig-zag on the television display.

6. The video signal of claim 1 wherein the pairs of black and white segments vary in time duration from the suppressed horizontal sync signal on each horizontal line from one line to the next by less than the duration of the black segment.

7. The video signal of claim 6 wherein, upon restoration of the horizontal sync signal to each horizontal line, the pairs of black and white segments include some black segments that are horizontally separated on the television display from other of said black segments without any horizontal overlap.

8. The video signal of claim 1 wherein the pairs of black and white segments vary in time duration from the suppressed horizontal sync signal on each horizontal line from one line to the next by less than one-third the duration of the black segment.

9. The video signal of claim 1 wherein, upon restoration of the horizontal sync signal to each horizontal line, the pairs of segments form a pattern in a vertical column along a right edge of the television display.

10. A video signal for display of a video image, said video signal representing a series of horizontal lines each with a horizontal sync signal, said scrambled video signal transmitted on a carrier wave, said video signal comprising:

a pair of segments on each horizontal line that has video image information to be scrambled, each pair of segments including a black segment capable of being interpreted by a television receiver as the horizontal sync signal and a white segment adjacent each black segment to form a high contrast transition therebetween, the pairs of black and white segments being arranged so that the high contrast transitions vary in horizontal location upon display from one horizontal line to the next.

11. The video signal of claim 10 wherein upon television display the pairs of segments appear on each line of the video image in a vertical arrangement extending along the vertical length of the video image.

12. The video signal of claim 10 further comprising a gray segment following each pair of black and white segments.

13. The video signal of claim 12 wherein each gray segment extends to an active end of its horizontal line.

14. The video signal of claim 10 wherein upon television display the pairs of black and white segments are arranged so that the high contrast transitions form a vertically extending zig-zag.

15. The video signal of claim 10 wherein the high contrast transitions vary in time delay from the horizontal sync signal from one line to the next by less than the duration of the black segment.

16. The video signal of claim 15 wherein the pairs of black and white segments includes some black segments that upon television display are horizontally separated from other of said black segments without any horizontal overlap.

17. The video signal of claim 10 wherein the high contrast transitions vary in time delay from the horizontal sync signal from one line to the next by less than one-third the duration of the black segment.

18. The video signal of claim 10 wherein upon television display the black and white segments are formed in a vertical column along the right edge of the video image.

19. A method for enhanced scrambling of a video signal comprising the steps of:

provinding an image;

transforming the image into a video signal having a series of horizontal lines each with a horizontal sync signal, wherein the video signal is characterized by being representative of a display including the image and an added pattern, the pattern being arranged such that each horizontal line, that has video image information to be scrambled, includes a pair of segments including a black segment capable of being interpreted by a television receiver as the horizontal sync signal and a white segment adjacent to each black segment to form a high contrast transition therebetween, the pairs of black and white segments being arranged so that the high contrast transitions vary in horizontal location from one horizontal line to the next; and suppressing the horizontal sync signals in the video signal.

20. The method of claim 19 wherein the step of transforming comprises adding the pattern to a computerized version of the image to produce a modified image and converting the modified image to a video signal.

21. The method of claim 19 wherein the step of transforming comprises forming the image into a video signal with horizontal sync signals and inserting black and white segments into the video signal.

22. The method of claim 19 wherein the pattern appears on each line of the video signal as a vertical arrangement extending along the vertical length of the display of the video signal.

23. The method of claim 19 wherein the pattern further includes a gray segment following each pair of black and white segments.

24. The method of claim 23 wherein each gray segment appears to extend to a right edge of the display of the video signal.

25. The method of claim 19 wherein the pairs of black and white segments are arranged so that the high contrast transitions form a vertically extending zig-zag on the display of the video signal.

26. The method of claim 19 wherein the pairs of black and white segments vary in horizontal location from one line to the next by less than the length of the black segment.

27. The method of claim 26 wherein the pairs of black and white segments includes some black segments that are horizontally separated from other of said black segments without any horizontal overlap of the black segments.

28. The method of claim 19 wherein the pairs of black and white segments vary in horizontal location from one line to the next by less than one-third the length of the black segment.

29. The method of claim 19 wherein the pattern is formed in a vertical column along the right edge of the display of the video signal.

30. The method of claim 19 further comprising dimming chrominance levels of the video signal outside of the pattern.

31. An enhanced scrambling pattern inserter comprising:

a sync detector connected to said video amplifier for detecting sync signals and a reference point on a video signal;

a video amplifier for receiving the video signal and setting the reference point on the video signal to a reference level;

a multiplexer coupled to said video amplifier, a white DC level and a black DC level; and control logic device responsive to sync signals detected by said sync detector for controlling said multiplexer so as to generate an enhanced video signal characterized by being representative of a display including an added pattern, the pattern being arranged such that each horizontal line in the pattern includes a pair of segments including a black segment capable of being interpreted by a television receiver as the horizontal sync signal and a white segment adjacent to each black segment to form a high contrast transition therebetween, the pairs of black and white segments being arranged so that the high contrast transitions vary in horizontal location from one horizontal line to the next.

32. An enhanced scrambling pattern inserter for inserting a pattern signal into a video signal containing at least one sync signal, the enhanced scrambling pattern inserter comprises:

a video signal amplifier for receiving the video signal and setting a reference point on the video signal to a reference level;

a sync stripper for indicating the sync signal, the sync stripper coupled to the video signal amplifier;

a multiplexor having inputs from the video signal amplifier and at least one pattern signal input; and a control logic device coupled to the sync stripper, which responds to the sync signal and controls the multiplexor to selectively substitute a signal from the pattern signal for the video signal so as to insert an enhanced scrambling pattern into the video signal to create a combined signal, the enhanced scrambling pattern being arranged such that each horizontal line in the pattern includes a pair of segments including a black segment capable of being interpreted by a television receiver as the horizontal sync signal and a white segment adjacent each black segment to form a high contrast transition therebetween, the pairs of black and white segments being arranged so that the high contrast transitions vary in horizontal location from one horizontal line to the next.

33. The enhanced pattern inserter of claim 32 further comprising:

a low-pass filter coupled to the multiplexor output for removing noise in the combined video signal and pattern signal.

34. The enhanced pattern inserter of claim 32 wherein the multiplexor contains multiple inputs for connecting other signals to perform portions of the scrambling operation.

35. The enhanced pattern inserter of claim 32 wherein the control logic device is formed by a programmable logic array.

36. The enhanced pattern inserter of claim 32 wherein the control logic device is formed by a programmed microprocessor.

37. The enhanced pattern inserter of claim 32 further comprising a clock, which works in conjunction with the control logic device for counting time periods to be used by the control logic device to determine when to issue a control signal to the multiplexor.

38. The enhanced pattern inserter of claim 32 further comprising a voltage signal generator for producing a black reference level, a white reference level, and a gray reference level, the reference level being connected to the at least one pattern signal inputs of the multiplexor.

39. The enhanced pattern inserter of claim 32 further comprising
   a sync signal remover, which removes the sync signal from the video signal, the sync signal remover is coupled to the sync stripper and to the control logic device.

40. An enhanced pattern inserter for inserting a pattern signal into a video signal, the video signal having a series of horizontal sync signals defining therebetween horizontal lines for television display, the enhanced pattern inserter comprises:
   a video signal amplifier for receiving the video signal and setting a reference point on the video signal to a reference level;
   a sync stripper for indicating the horizontal sync signal within the video signal, the sync stripper coupled to the video signal amplifier;
   a white reference level signal generator;
   a black reference level signal generator;
   a gray reference level signal generator;
   a multiplexor having inputs from the video signal amplifier and from the black reference level signal generator, the white reference level signal generator, and the gray reference level signal generator, the multiplexor outputs a scrambled video signal; and
   a control logic device coupled to the sync stripper, which responds to the sync signal and controls the multiplexor 41. The enhanced pattern inserter of claim 40 wherein the scrambled video signal contains a pair of segments, to promote enhanced scrambling, on each horizontal line that has video image information to be scrambled, each pair of segments includes a black segment capable of being interpreted by a television receiver as the horizontal sync signal and a white segment adjacent to each black segment to form a high contrast transition therebetween, the pairs of black and white segments being arranged so that the high contrast transitions vary in horizontal location from one horizontal line to the next.

42. The enhanced pattern inserter of claim 41 further comprising a gray segment following each pair of black and white segments.

43. The enhanced pattern inserter of claim 40 wherein the control logic device is formed by a programmable logic array.

44. The enhanced pattern inserter of claim 40 wherein the control logic device is formed by a programmed microprocessor.

45. The enhanced pattern inserter of claim 40 further comprising
   a clock, which works in conjunction with the control logic device for counting time periods to be used by the control logic device to determine when to issue a control signal to the multiplexor.

46. An enhanced pattern inserter for inserting a pattern signal into a video signal, the video signal representing a series of horizontal lines each with a horizontal sync signal, the enhanced pattern inserter comprising:
   a video signal amplifier for receiving the video signal and setting a reference point on the video signal to a reference level;
   a sync stripper for indicating the horizontal sync signal within the video signal, the sync stripper coupled to the video signal amplifier;
   a white reference level signal generator;
   a black reference level signal generator;
   a gray reference level signal generator;
   a multiplexor having inputs from the video signal amplifier and the black reference level signal generator, the white reference level signal generator, and the gray reference level signal generator, the multiplexor outputs a scrambled video signal;
   a control logic device coupled to the sync stripper, which responds to the sync signal and controls the multiplexor; and
   a sync signal remover, which removes the horizontal sync signal from the video signal, the sync signal remover is coupled to the sync stripper and to the control logic device.

47. The enhanced pattern inserter of claim 46 wherein the video signal comprises a pair of segments on each horizontal line that has video image information to be scrambled, each pair of segments including a black segment capable of being interpreted by a television receiver as the horizontal sync signal and a white segment adjacent to each black segment to form a high contrast transition therebetween, the pairs of black and white segments being arranged so that the high contrast transitions vary in horizontal location upon display from one horizontal line to the next.

48. The enhanced pattern inserter of claim 47 wherein the video signal further comprises a gray segment following each pair of black and white segments.

49. The enhanced pattern inserter of claim 47 wherein, upon television display, the pairs of black and white segments are arranged so that the high contrast transitions form a vertically extending zig-zag.

50. The enhanced pattern inserter of claim 46 further comprising:
   a low-pass filter coupled to the multiplexor output for removing noise in the combined video signal and pattern signal.

51. The enhanced pattern inserter of claim 46 further comprising:
   a clock, which works in conjunction with the control logic device for counting time periods to determine when to issue a control signal to the multiplexor.

52. A scrambled video signal having a series of suppressed horizontal sync signals defining therebetween horizontal lines for television display upon restoring a horizontal sync signal to each horizontal line, said scrambled video signal transmitted on a video transmission signal, said scrambled video signal comprising:
   a pair of segments on a number of horizontal lines that have still image video information to be scrambled so that the still image video information is illegible when viewed on a television, each pair of segments including a black segment capable of being interpreted by a television receiver as the horizontal sync signal and a white segment adjacent to each black segment to form a high contrast transition therebetween, the pairs of black and white segments being arranged so that the high contrast transitions vary in horizontal location from one occurrence to the next.

53. A method for enhanced scrambling of a video signal comprising the steps of:
   providing a still video image;
   transforming the still video image into a video signal having a series of horizontal lines each with a horizontal sync signal, wherein the video signal includes the still video image and an added pattern, the pattern being arranged such that a number of horizontal lines that have still video image information to be scrambled contain the pattern so that the still video image is illegible when viewed on a television, the pattern includes a pair of segments including a black segment capable of being interpreted by a television receiver as the horizontal sync signal and a white segment adjacent to each black segment to form a high contrast transition therebetween, the pairs of black and white segments being arranged so that the high contrast transitions vary in horizontal location from one occurrence to the next; and suppressing the horizontal sync signals in the video signal.

* * * * *